(12) United States Patent
Dahlke et al.

(10) Patent No.: US 11,772,617 B2
(45) Date of Patent: Oct. 3, 2023

(54) METHOD FOR OPERATING A MOTOR VEHICLE, DEVICE, AND MOTOR VEHICLE

(71) Applicant: Robert Bosch GmbH, Stuttgart (DE)

(72) Inventors: Franz Dahlke, Karlsruhe (DE); Christian Woerz, Beilstein (DE)

(73) Assignee: ROBERT BOSCH GMBH, Stuttgart (DE)

( * ) Notice: Subject to any disclaimer, the term of this patent is extended or adjusted under 35 U.S.C. 154(b) by 243 days.

(21) Appl. No.: 17/024,070

(22) Filed: Sep. 17, 2020

(65) Prior Publication Data

US 2021/0114566 A1 Apr. 22, 2021

(30) Foreign Application Priority Data

Oct. 16, 2019 (DE) .......................... 102019215914.1

(51) Int. Cl.
| | |
|---|---|
| *B60T 8/171* | (2006.01) |
| *B60T 13/74* | (2006.01) |
| *B60W 10/192* | (2012.01) |
| *B60W 10/08* | (2006.01) |

(52) U.S. Cl.
CPC ............ *B60T 8/171* (2013.01); *B60T 13/745* (2013.01); *B60W 10/08* (2013.01); *B60W 10/192* (2013.01)

(58) Field of Classification Search
CPC ...... B60T 8/171; B60T 13/745; B60W 10/08; B60W 10/192
See application file for complete search history.

(56) References Cited

U.S. PATENT DOCUMENTS

| | | | |
|---|---|---|---|
| 2009/0319132 A1* | 12/2009 | Qi .......................... | B60K 31/00 701/48 |
| 2010/0049415 A1* | 2/2010 | Bauerle ................. | B60T 8/1837 303/125 |
| 2016/0202719 A1* | 7/2016 | Lippman ............... | B60T 8/3255 74/513 |
| 2018/0134292 A1* | 5/2018 | Alpman .................. | B60T 7/122 |
| 2018/0186352 A1* | 7/2018 | Goto ......................... | B60T 8/17 |
| 2019/0055762 A1* | 2/2019 | Nottebaum ............. | E05C 17/12 |
| 2019/0366989 A1* | 12/2019 | James ................... | B60T 8/1708 |
| 2020/0023850 A1* | 1/2020 | Burford ............. | B60W 10/182 |

* cited by examiner

*Primary Examiner* — Yazan A Soofi
*Assistant Examiner* — Naeem Taslim Alam
(74) *Attorney, Agent, or Firm* — NORTON ROSE FULBRIGHT US LLP; Gerard Messina

(57) ABSTRACT

A method for operating a motor vehicle including an actuating element which is, in particular steplessly, displaceable between a first end position and a second end position. An instantaneous position of the actuating element is monitored. A deceleration torque being predefined for the motor vehicle when the instantaneous position is in a deceleration range situated between the first end position and a predefinable change position, and an acceleration torque being predefined for the motor vehicle when the instantaneous position is in an acceleration range situated between the second end position and the change position. A monitoring is carried out for the occurrence of at least one disturbance variable which influences an actual deceleration of the motor vehicle effectuated by the deceleration torque, the deceleration torque being changed as a function of a detected disturbance variable.

7 Claims, 2 Drawing Sheets

METHOD FOR OPERATING A MOTOR VEHICLE, DEVICE, AND MOTOR VEHICLE

CROSS REFERENCE

The present application claims the benefit under 35 U.S.C. § 119 of German Patent Application No. DE 102019215914.1 filed on Oct. 16, 2019, which is expressly incorporated herein by reference in its entirety.

FIELD

The present invention relates to a method for operating a motor vehicle including an actuating element which is, in particular infinitely, displaceable between a first end position and a second end position, an instantaneous position of the actuating element being monitored, a deceleration torque being predefined for the motor vehicle when the instantaneous position is in a deceleration range situated between the first end position and a predefinable change position, and an acceleration torque being predefined for the motor vehicle when the instantaneous position is in an acceleration range situated between the second end position and the change position.

The present invention also relates to a device for operating a motor vehicle, using a control unit.

The present invention furthermore relates to a motor vehicle including such a device.

BACKGROUND INFORMATION

Motor vehicles including an electrical driving machine increasingly include actuating elements having a so-called single-pedal function. An acceleration torque or a deceleration torque is selectively predefinable by such an actuating element. The actuating element is displaceable between a first end position and a second end position, a change position being predefined between the end positions. An instantaneous position of the actuating element is monitored for operating the motor vehicle with the aid of the actuating element. The deceleration torque is predefined for the motor vehicle in the process when the instantaneous position is in a deceleration range situated between the first end position and the change position, i.e., when the instantaneous position of the actuating element falls short of the change position. If, however, the instantaneous position of the actuating element is situated in an acceleration range situated between the change position and the second end position, so that the instantaneous position exceeds the change position, the acceleration torque is thus predefined for the motor vehicle.

SUMMARY

A method according to an example embodiment of the present invention may increase the driving comfort for a user of the motor vehicle during the deceleration of the motor vehicle with the aid of the actuating element. According to an example embodiment of the present invention, it is provided for this purpose that a monitoring is carried out for the occurrence of at least one disturbance variable which influences an actual deceleration of the motor vehicle effectuated by the deceleration torque, the deceleration torque being changed as a function of a detected disturbance variable. In the absence of disturbance variables, a certain deceleration torque always causes the same actual deceleration of the motor vehicle at a certain driving speed of the motor vehicle. This actual deceleration is influenced by the occurrence of certain disturbance variables. For example, the actual deceleration is increased or reduced by the disturbance variables. The increase or reduction of the actual deceleration is noticeable by the user of the motor vehicle and is often perceived as unpleasant. This may be avoided by changing the deceleration torque. For example, at a constant position of the actuating element, the predefined deceleration torque is increased or reduced as a function of the detected disturbance variable. The deceleration torque which would be predefined in the absence of disturbance variables is preferably changed by multiplication with a factor which correlates with the detected disturbance variable. The deceleration torque is preferably changed as a function of multiple, simultaneously present and detected disturbance variables.

According to one preferred specific embodiment of the present invention, it is provided that the deceleration torque is changed in such a way that the influence of the disturbance variable on the actual deceleration is compensated for by the change. The deceleration torque is thus changed, in particular, increased or reduced, in such a way that the actual deceleration is effectuated, which would be effectuated by the unchanged deceleration torque in the absence of disturbance variables. The detected disturbance variable is accordingly not noticed by the user, and thus also not perceived as unpleasant.

Preferably, an uphill grade and/or a downhill grade of a road on which the motor vehicle is driving is monitored as the disturbance variable. If the road has an uphill grade as the disturbance variable, the actual deceleration effectuated by the deceleration torque is increased. If, however, the road has a downhill grade as the disturbance variable, the actual deceleration effectuated by the deceleration torque is reduced. The uphill grade and/or the downhill grade is/are preferably detected with the aid of a sensor unit of the motor vehicle. The sensor unit is then a rotation rate sensor, for example. As an alternative or in addition, a position of the motor vehicle is ascertained as a function of navigation satellite signals detected with the aid of a navigation unit of the motor vehicle. To ascertain the uphill grade and/or the downhill grade, the ascertained position is then compared to a map in which in each case an uphill grade or a downhill grade is stored for different possible positions.

According to one preferred specific embodiment of the present invention, it is provided that a wind speed and/or a wind direction in the surroundings of the motor vehicle is/are monitored as the disturbance variable. For example, the actual deceleration effectuated by the deceleration torque is increased by a wind directed counter to a driving direction of the motor vehicle. In contrast, the actual deceleration is reduced as a result of a wind oriented in the driving direction. The wind speed and/or the wind direction is/are preferably detected by a wind sensor of the motor vehicle.

A payload onto the motor vehicle and/or a total weight of the motor vehicle is/are preferably monitored as the disturbance variable. As a result of the payload onto the motor vehicle and/or an increase in the total weight of the motor vehicle, the actual deceleration effectuated by the deceleration torque is reduced. The payload and/or the total weight is/are preferably monitored by at least one sensor unit of the motor vehicle. For example, a sensor unit is present which is designed to ascertain the payload and/or the total weight based on a state of wheel suspensions of the motor vehicle. The total weight of the motor vehicle is also increased by attaching a trailer to the motor vehicle, and thus the actual deceleration effectuated by the deceleration torque is reduced.

Preferably, a sensor unit is present which is designed to monitor whether or not a trailer is attached to the motor vehicle.

According to one preferred specific embodiment of the present invention, it is provided that an electric motor, which is designed to actuate a master brake cylinder of the motor vehicle, is activated to at least partially generate the deceleration torque, that an electric motor of a driving dynamics control system of the motor vehicle is activated to at least partially generate the deceleration torque, and/or that an electrical driving machine of the motor vehicle is activated to at least partially generate the deceleration torque by operating the electrical driving machine as a generator. Hereafter, the electric motor which is designed to actuate the master brake cylinder is referred to as the first electric motor. The electric motor of the driving dynamics control system is referred to as the second electric motor. The first electric motor is designed to generate a deceleration torque by the actuation of the master brake cylinder and/or to increase a deceleration torque generated by the actuation of a brake pedal present in addition to the actuating element. For example, iBooster brake actuation units of the applicant include such electric motors. The second electric motor is designed, for example, to actuate at least one fluid pump of a hydraulic block of the driving dynamics control system in order to generate the deceleration torque. Preferably at least two of the following are activated to jointly generate the deceleration torque: the first electric motor, the second electric motor, and the electrical driving machine.

The electric motor, which is designed to actuate the master brake cylinder, is preferably activated to generate a base deceleration torque, the electric motor of the driving dynamics control system and/or the electrical driving machine being activated to compensate for the influence of the disturbance variable on the actual deceleration. The base deceleration torque is preferably the deceleration torque which would be predefined in the absence of disturbance variables. A compensation deceleration torque is generated by the second electric motor and/or the electrical driving machine. The brake pedal, which is, in general, present in addition to the actuating element, is often coupled to the first electric motor in such a way that a position of the brake pedal is changed when the master brake cylinder is actuated by the first electric motor. The influence of the disturbance variable being compensated for by an activation of the second electric motor and/or of the electrical driving machine results in the advantage that the position of the brake pedal is not changed by the compensation of the influence of the disturbance variable. A change in the position of the brake pedal could be perceived as unpleasant by the user of the motor vehicle.

An example device according to the present invention for operating a motor vehicle including an actuating element which is, in particular infinitely, displaceable between a first end position and a second end position, includes a control unit which is specifically configured to carry out the method according to the present invention when used as intended. This also results in the aforementioned advantages. Further preferred features and feature combinations result from the description herein. The device preferably includes at least one sensor unit which is communicatively connected to the control unit and designed to monitor at least one disturbance variable which effectuates an actual deceleration of the motor vehicle.

An example motor vehicle according to the present invention includes an actuating element which is, in particular steplessly, displaceable between a first end position and a second end position and, includes the device according to the present invention. This also results in the aforementioned advantages. Further preferred features and feature combinations result from what is described herein.

The present invention is described in greater detail hereafter based on the figures.

DETAILED DESCRIPTION OF EXAMPLE EMBODIMENTS

Figure 1:
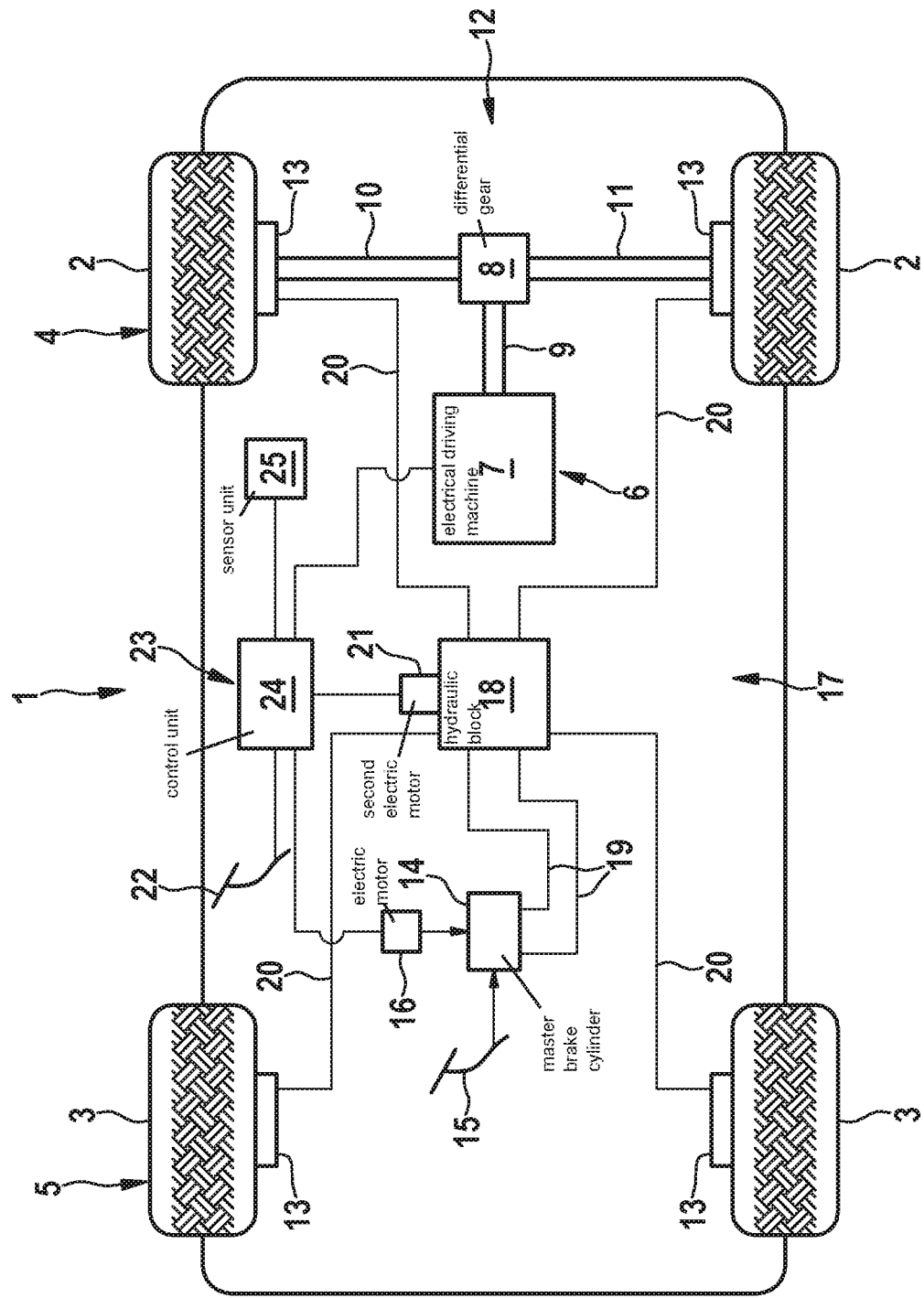
FIG. 1 shows a motor vehicle including an actuating element in a simplified illustration.

FIG. 1 shows a motor vehicle 1 in a simplified illustration. In the present example, motor vehicle 1 includes four wheels 2 and 3, wheels 2 being assigned to a front axle 4 and wheels 3 being assigned to a rear axle 5. Motor vehicle 1 furthermore includes a drive system 6 including an electrical driving machine 7 operable as a generator. Driving machine 7 is connected by a differential gear 8 and shafts 9, 10 and 11 to wheels 2 of front axle 4, so that wheels 2 are drivable by driving machine 7.

Motor vehicle 1 furthermore includes a braking system 12. Braking system 12 includes four friction braking units 13, each of wheels 2 and 3 being assigned a different of friction braking units 13. For actuating friction braking units 13, braking system 12 includes a master brake cylinder 14, which in the present example is designed as a tandem master brake cylinder 14. Master brake cylinder 14 is actuatable by the actuation of a brake pedal 15. Moreover, master brake cylinder 14 is also actuatable by an electric motor 16, which is assigned to master brake cylinder 14. This electric motor 16 is hereafter referred to as first electric motor 16. Brake pedal 15 is coupled to first electric motor 16 or a piston mounted in master brake cylinder 14 in such a way that a position of brake pedal 15 is changed during an actuation of master brake cylinder 14 by first electric motor 16.

Braking system 12 furthermore includes a driving dynamics control system 17. Driving dynamics control system 17 includes a hydraulic block 18. Hydraulic block 18 is fluidically connected to master brake cylinder 14 by two input lines 19. Hydraulic block 18 is moreover fluidically connected to friction braking units 13 by four output lines 20. Driving dynamics control system 17 includes an electric motor 21 which is designed to actuate at least one fluid pump of hydraulic block 18, which is not shown in the figure, in order to actuate one or multiple of friction braking units 13 by the actuation of the at least one fluid pump. This electric motor 21 is hereafter referred to as second electric motor 21.

Motor vehicle 1 shown in FIG. 1 furthermore includes an actuating element 22. Actuating element 22 is designed as a pedal is and steplessly displaceable between a first end position and a second end position. The position of actuating element 22 in the first end position corresponds to a percentage value of 0% based on the actuating travel from the first end position to the second end position, and the position of actuating element 22 in the second end position corresponds to a percentage value of 100%. With the aid of actuating element 22, an acceleration torque or a deceleration torque may selectively be predefined for motor vehicle 1. The acceleration torque is predefined in the process when the instantaneous position of actuating element 22 exceeds a predefinable change position situated between the end positions. The instantaneous position of actuating element 22 is then situated in an acceleration range. If the instantaneous position of actuating element 22 falls short of the change position, the deceleration torque is predefined. The instantaneous position is then situated in a deceleration range.

Motor vehicle 1 furthermore includes a device 23. Device 23 includes a control unit 24 for predefining the acceleration torque or the deceleration torque. Control unit 24 is communicatively connected to actuating element 22, first electric motor 16, second electric motor 21 and driving machine 7. If the acceleration torque is to be predefined based on the instantaneous position of actuating element 22, control unit 24 activates driving machine 7 for generating the acceleration torque. If, however, the deceleration torque is to be predefined, control unit 24 activates first electric motor 16, second electric motor 21 and/or driving machine 7 for generating the deceleration torque.

Device 23 furthermore includes at least one sensor unit 25 which is communicatively connected to control unit 24. Sensor unit 25 is designed to monitor the occurrence of at least one disturbance variable which influences an actual deceleration of motor vehicle 1 effectuated by the deceleration torque. For example, sensor unit 25 monitors an uphill grade and/or a downhill grade of a road on which motor vehicle 1 is driving as the disturbance variable. As an alternative thereto, sensor unit 25 preferably monitors a wind speed and/or a wind direction in the surroundings of motor vehicle 1 as the disturbance variable. As an alternative thereto, sensor unit 25 preferably monitors a payload onto motor vehicle 1 and/or a total weight of motor vehicle 1 as the disturbance variable. FIG. 1 only shows a single such sensor unit 25. Preferably, however, multiple sensor units 25 are present, sensor units 25 then each monitoring different of the above-described disturbance variables.

Figure 2:
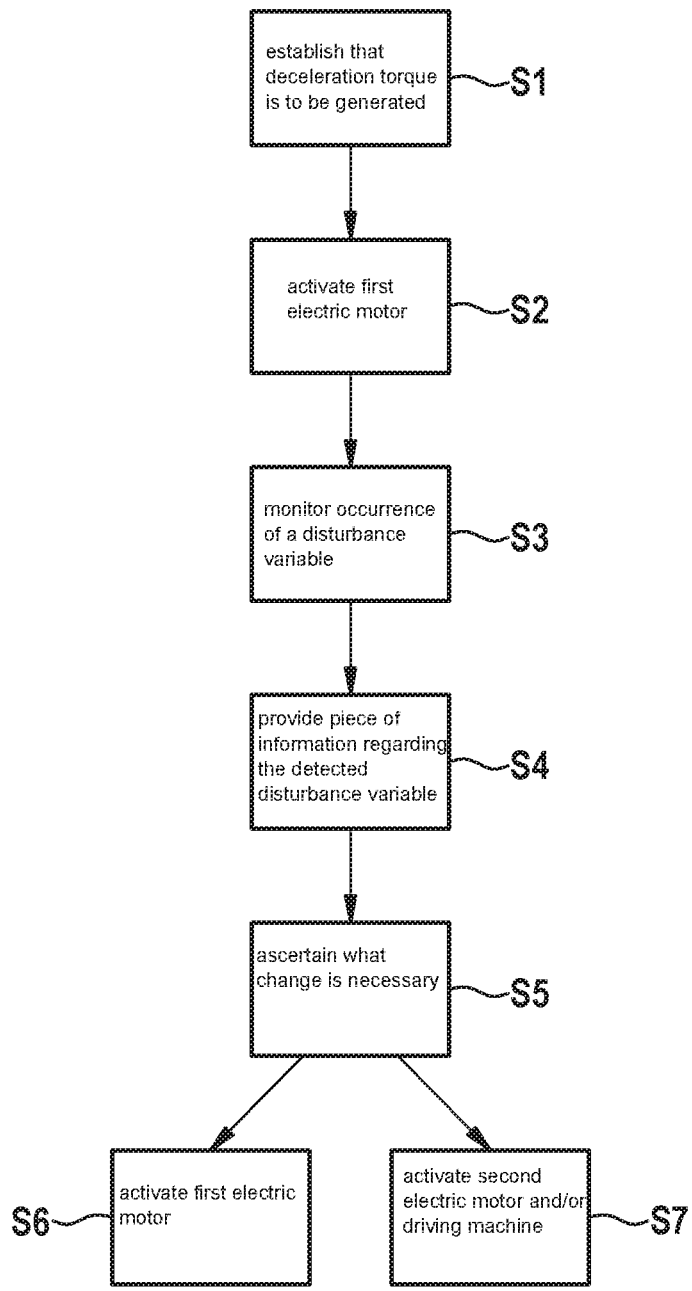
FIG. 2 shows an example method for operating the motor vehicle with the aid of the actuating element, in accordance with the present invention.

A method for operating motor vehicle 1 is described hereafter with reference to FIG. 2 based on a flow chart. It is assumed in the process that the position of actuating element 22 is situated in the deceleration range and is constant.

Since the instantaneous position of actuating element 22 is situated in the deceleration range, control unit 24 in a first step S1 establishes that the deceleration torque is to be generated. To generate the deceleration torque, control unit 24 then, in a second step S2, activates first electric motor 16 in such a way that first electric motor 16 actuates master brake cylinder 14.

In a third step S3, sensor unit 25 monitors the occurrence of a disturbance variable. For example, sensor unit 25 monitors whether the road on which motor vehicle 1 is driving has an uphill grade or a downhill grade as the disturbance variable. If sensor unit 25 establishes in step S3 that the disturbance variable is present, control unit 25 in a fourth step S4 provides a piece of information regarding the detected disturbance variable to control unit 24.

In a fifth step S5, control unit 24 ascertains as a function of the piece of information what change in the deceleration torque is necessary to compensate for the influence of the disturbance variable on the actual deceleration of motor vehicle 1. If an uphill grade was established as the disturbance variable, control unit 24 ascertains that the deceleration torque has to be reduced. If, however, a downhill grade was established, control unit 24 ascertains that the deceleration torque has to be increased.

If control unit 24 establishes in step S5 that the deceleration torque has to be reduced in order to compensate for the influence of the disturbance variable on the actual deceleration, reference is made to a sixth step S6. In step S6, control unit 24 then activates first electric motor 16 in such a way that first electric motor 16 actuates master brake cylinder 14 in such a way that a reduced deceleration torque is generated. As an alternative or in addition, control unit 24 activates a braking torque blending function of braking system 12. Upon activation of the braking torque blending function, at least a portion of a hydraulic fluid of braking system 12 is displaced into a fluid reservoir, which is not shown, so that the deceleration torque is reduced independently of an activation of first electric motor 16. If the deceleration torque is only reduced by activation of the braking torque blending function, the position of brake pedal 15 is not changed upon the reduction of the deceleration torque.

However, if control unit 24 establishes in step S5 that the deceleration torque has to be increased in order to compensate for the influence of the disturbance variable on the actual deceleration, reference is made to a seventh step S7. In step S7, control unit 24 then activates second electric motor 21 and/or driving machine 7, in addition to first electric motor 16, so that one or both of these devices generate an additional compensation deceleration torque by which the influence of the disturbance variable on the actual deceleration is compensated for. Since the compensation deceleration torque is generated by second electric motor 21 and/or by driving machine 7, the position of brake pedal 15 is not changed upon the increase of the deceleration torque.

What is claimed is:

1. A method for operating a motor vehicle including an actuating element which is steplessly displaceable between a first end position and a second end position, the method comprising the following steps:
    monitoring an instantaneous position of the actuating element, a deceleration torque being predefined for the motor vehicle when the instantaneous position is in a deceleration range situated between the first end position and a predefinable change position, and an acceleration torque being predefined for the motor vehicle when the instantaneous position is in an acceleration range situated between the second end position and the predefinable change position;
    monitoring for an occurrence of at least one disturbance variable which influences an actual deceleration of the motor vehicle effectuated by the deceleration torque;
    changing the deceleration torque as a function of the at least one detected disturbance variable; and
    (i) activating an electric motor which is configured to actuate a master brake cylinder of the motor vehicle, to at least partially generate the deceleration torque, and/or (ii) activating an electric motor of a driving dynamics control system of the motor vehicle to at least partially generate the deceleration torque, and/or (iii) activating an electrical driving machine of the motor vehicle to at least partially generate the deceleration torque by operating the electrical driving machine as a generator, wherein:
    the electric motor, which is configured to actuate the master brake cylinder, is activated to generate a base deceleration torque when the at least one disturbance variable has been detected, the base deceleration corresponding to a deceleration torque which would be predefined in the absence of the at least one disturbance variable, and the electric motor of the driving dynamics control system and/or the electrical driving machine is activated to modify the base deceleration torque in order to compensate for the influence of the at least one disturbance variable on the actual deceleration.

2. The method as recited in claim 1, wherein the deceleration torque is changed in such a way that the influence of the at least one disturbance variable on the actual deceleration is compensated for by the change.

3. The method as recited in claim 1, wherein an uphill grade and/or a downhill grade, of a road on which the motor vehicle is driving, is monitored as the at least one disturbance variable.

4. The method as recited in claim 1, wherein a wind speed and/or a wind direction, in surroundings of the motor vehicle, is monitored as the at least one disturbance variable.

5. The method as recited in claim 1, wherein a payload onto the motor vehicle and/or a total weight of the motor vehicle, is monitored as the at least one disturbance variable.

6. A device for operating a motor vehicle, the motor vehicle including an actuating element which is steplessly displaceable between a first end position and a second end position, wherein the device:

is configured to:
monitor an instantaneous position of the actuating element, a deceleration torque being predefined for the motor vehicle when the instantaneous position is in a deceleration range situated between the first end position and a predefinable change position, and an acceleration torque being predefined for the motor vehicle when the instantaneous position is in an acceleration range situated between the second end position and the predefinable change position;

monitor for an occurrence of at least one disturbance variable which influences an actual deceleration of the motor vehicle effectuated by the deceleration torque;

change the deceleration torque as a function of the at least one detected disturbance variable; and (i) activate an electric motor which is configured to actuate a master brake cylinder of the motor vehicle, to at least partially generate the deceleration torque, and/or (ii) activate an electric motor of a driving dynamics control system of the motor vehicle to at least partially generate the deceleration torque, and/or (iii) activate an electrical driving machine of the motor vehicle to at least partially generate the deceleration torque by operating the electrical driving machine as a generator, wherein:

the electric motor, which is configured to actuate the master brake cylinder, is activated to generate a base deceleration torque when the at least one disturbance variable has been detected, the base deceleration corresponding to a deceleration torque which would be predefined in the absence of the at least one disturbance variable, and the electric motor of the driving dynamics control system and/or the electrical driving machine is activated to modify the base deceleration torque in order to compensate for the influence of the at least one disturbance variable on the actual deceleration.

7. A motor vehicle, comprising:
an actuating element configured to steplessly displace between a first end position and a second end position; and a device configured to operate the motor vehicle, the device being configured to:
monitor an instantaneous position of the actuating element, a deceleration torque being predefined for the motor vehicle when the instantaneous position is in a deceleration range situated between the first end position and a predefinable change position, and an acceleration torque being predefined for the motor vehicle when the instantaneous position is in an acceleration range situated between the second end position and the predefinable change position;

monitor for an occurrence of at least one disturbance variable which influences an actual deceleration of the motor vehicle effectuated by the deceleration torque;

change the deceleration torque as a function of the at least one detected disturbance variable; and (i) activating an electric motor which is configured to actuate a master brake cylinder of the motor vehicle, to at least partially generate the deceleration torque, and/or (ii) activating an electric motor of a driving dynamics control system of the motor vehicle to at least partially generate the deceleration torque, and/or (iii) activating an electrical driving machine of the motor vehicle to at least partially generate the deceleration torque by operating the electrical driving machine as a generator, wherein:

the electric motor, which is configured to actuate the master brake cylinder, is activated to generate a base deceleration torque when the at least one disturbance variable has been detected, the base deceleration corresponding to a deceleration torque which would be predefined in the absence of the at least one disturbance variable, and the electric motor of the driving dynamics control system and/or the electrical driving machine is activated to modify the base deceleration torque in order to compensate for the influence of the at least one disturbance variable on the actual deceleration.

\* \* \* \* \*